[11] 3,586,418

[72] Inventor Haruo Sakai, Osaka, Japan
[21] Appl. No. 807,760
[22] Filed Mar. 17, 1969
[45] Patented June 22, 1971
[73] Assignee Minolta Camera Co., Ltd. Osaka, Japan
[32] Priority Mar. 27, 1968
[33] Japan
[31] 43-19918

[54] WIDE-ANGLE EYEPIECE LENS SYSTEM
6 Claims, 10 Drawing Figs.
[52] U.S. Cl. ............... 350/176, 350/220, 350/225
[51] Int. Cl. ............... G02b 9/12, G02b 9/34, G02b 25/00
[50] Field of Search ............... 350/175 E, 220, 224, 225, 228, 176

[56] References Cited
UNITED STATES PATENTS
2,549,158  4/1951  Bertele ............... 350/224 X FOREIGN PATENTS
295,732  3/1954  Switzerland ............... 350/220
953,022  11/1956  Germany ............... 350/228

Primary Examiner—John K. Corbin
Attorney—Stanley Wolder

ABSTRACT: A highly corrected wide-angle eyepiece lens system includes first, third and fifth positive and second, fourth and sixth negative lens elements the first two elements forming a cemented positive composite lens with a concave rear and convex front face and the third and fourth elements forming cemented positive lens with a convex rear face, the fifth element rear face and the sixth element front face being concentric with a point on the image side. The lens system possesses the following relationship:

$$|r_9| \leq |r_{12}| + d_9 - 12 \leq 1.5f |r_5| \leq |r_4| \leq 2.5 F$$

wherein $r_n$ is the radius of curvature of the subscript designated lens face; $d_{9,12}$ is the axial distance between the ninth and 12th lens faces and $f$ is the focal length of the lens system.

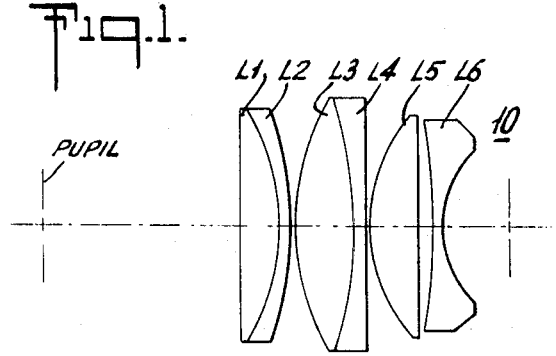
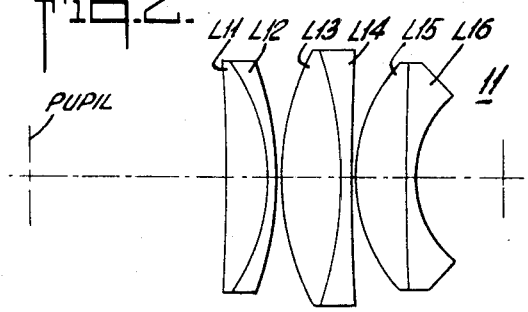
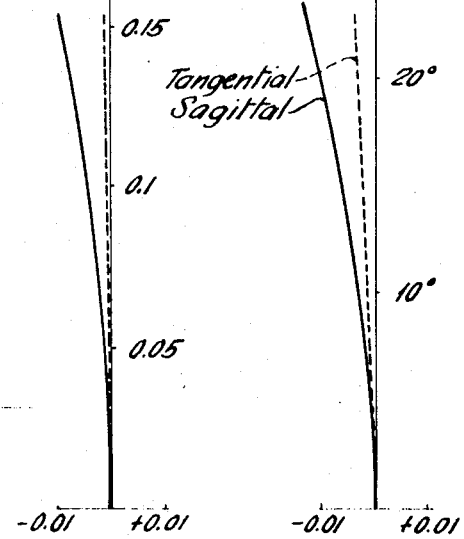
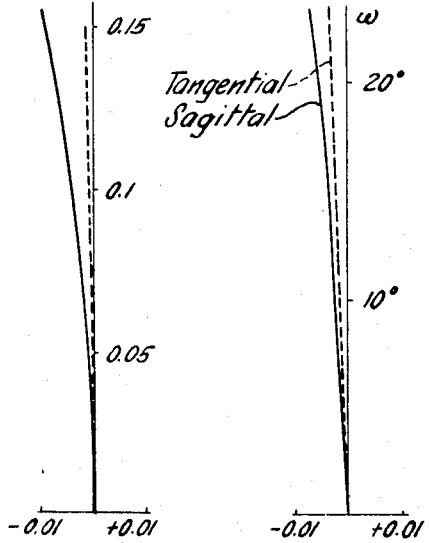
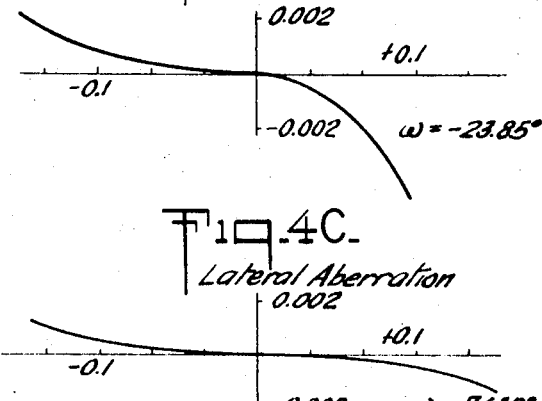
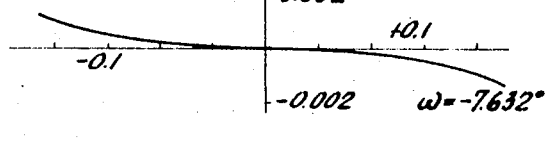
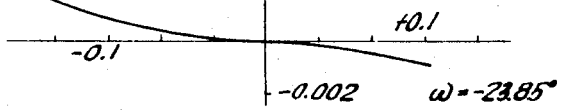
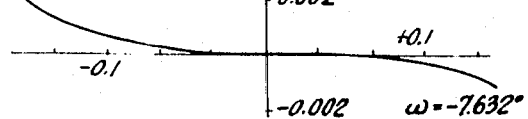
INVENTOR
HARUO ABE
BY Stanley Wolder
ATTORNEY

WIDE-ANGLE EYEPIECE LENS SYSTEM

BACKGROUND OF THE INVENTION

The present invention relates generally to improvements in optical lens systems and it relates particularly to an improved highly corrected, wide-angle eyepiece optical system.

The eyepiece optical lens systems having a wide viewing angle, that is exceeding about 45°, heretofore proposed or available, possess numerous drawbacks and disadvantages. Many optical instruments require an eyepiece having a wide viewing angle, a large pupil aperture, high resolution and high degree of correction of the various aberrations. Such properties are generally required in dark field and under similar viewing conditions. The eyepiece lens systems heretofore employed, represent a compromise in which desired characteristics are sacrificed to improve other characteristics and thus leave much to be desired.

SUMMARY OF THE INVENTION

It is thus a principal object of the present invention to provide an improved lens system.

Another object of the present invention is to provide an improved eyepiece lens system.

Still another object of the present invention is to provide an improved highly corrected, wide-angle, large-aperture eyepiece lens system of high resolution.

A further object of the present invention is to provide a lens system of the above nature, characterized by its versatility and accompanying The above and other objects of the present invention will become apparent from a reading of the following description taken in conjunction with the accompanying drawings which illustrate preferred embodiments thereof.

In a sense, the present invention contemplates the provision of a wide-angle eyepiece lens system comprising six lens elements successively designated from the pupil side as the first to the 12th, the first and second lens elements being cemented at their confronting faces to form a first positive composite lens with a convex fourth face and the third and fourth lens elements being cemented at their confronting faces to form a second positive composite lens with a convex fifth face, said fifth lens element being positive and said sixth lens element being negative, and wherein $$r_9 \leq r_{12} - d_{9-12} \leq 1.5f$$
$$r_3 \leq r_4 \leq 2.5f$$

wherein $r_n$ is the radius of curvature of the subscript designated lens face; $d_{9-12}$ is the axial distance between the ninth and 12th lens face and $f$ is the focal length of the eyepiece. The fifth and sixth lenses may be separated by an air space or cemented together to form a composite lens.

Advantageously the first lens face is concave and the first and third lens elements are positive with refractive indices no less than 1.700 and Abbe's numbers no less than 45 and the second and fourth lens elements are negative with Abbe numbers not exceeding 30. The ninth and 12th lens faces are convex and concave respectively and concentric with a point on the image side. The indices of refraction set forth herein are for the $d$-line $N_d$ (wavelength 587.6 m$\mu$).

Generally, a wide-angle eyepiece lens system, that is one having a field of view exceeding 45°, possesses a large positive Petzval sum value as a result of the large positive refractive power of the positive lenses of the system and it is difficult to reduce the curvature of the field over the full field of view and to satisfactorily compensate and correct astigmatism, coma and the like. It has been found that these difficulties are excellently overcome by the conditions:

(1) $r_9 \leq r_{12} + d_{9-12} \leq 1.5f$
(2) $|r_3| \leq |r_4| \: 2.5f$ as set forth.

The first condition (1) is effective in reducing the Petzval sum and reducing and balancing astigmatism and coma, and the second condition (2) provides a range of selection of the lens materials which is effective for substantially eliminating spherical aberration and coma and simultaneously substantially eliminating longitudinal and lateral chromatic aberration.

BRIEF DESCRIPTION OF THE DRAWINGS

FIG. 1 is a longitudinal sectional view of an embodiment of the present invention;

FIG. 2 is a view similar to FIG. 1 of another embodiment of the present invention;

FIGS. 3A to 3D are graphs respectively of the spherical aberration, astigmatism, lateral aberration at an angle of 7.632°, and lateral aberration at an angle of 23.85° of the embodiment of FIG. 1; and FIGS. 4A to 4D are graphs similar to those of FIGS. 3A to 3D of the embodiment of FIG. 2.

DESCRIPTION OF THE PREFERRED EMBODIMENTS

Referring now to the drawings and particularly FIG. 1 thereof which illustrates a preferred embodiment of the present invention, the reference numeral 10 generally designates the improved lens system, the rear face of which, when in use is spaced a distance $d_0$ from the pupil. The lens system includes six consecutively designated lens elements L1 to L6, the first two lens elements L1 and L2 being cemented together to form a first composite positive lens the third and fourth lens elements L3 and L4 being cemented together to form a second composite positive lens and the fifth and sixth lenses L5 and L6 being separated by an air space.

Lens element L1 is positive and has an index of refraction $N_1$ and Abbe number $V_1$, a thickness $d_1$, a concave rear face of radius of curvature $r_1$ and a convex front face of radius of curvature $r_2$ lens element L2 is negative and has a concave rear face cemented to lens element L1 front face and with a radius of curvature $r_3$ equal to $r_2$, a convex front face of radius of curvature $r_4$, a thickness $d_3$, index of refraction $N_2$ and Abbe number $V_2$. Lens element L3 is spaced a distance $d_4$ from lens L2 front face, is positive and has an index of refraction $N_3$, an Abbe number $V_3$, a thickness $d_5$, a convex rear face of radius of curvature $r_5$ and a convex front face of radius of curvature $r_6$, and lens element L4 is negative and has a concave rear face cemented to lens element L3 front face and with a radius of curvature $r_7$, an index of refraction $N_4$ and an Abbe number $V_4$.

Lens element L5 is positive with a convex rear face a distance $d_8$ from lens element L4 front face and with a radius of curvature $r_9$, and with a concave front face of radius of curvature $r_{10}$, and has a thickness $d_9$, an index of refraction $N_5$ and an Abbe number $V_5$. Lens element L6 is negative with a concave rear face spaced from lens L5 front face a distance $d_{10}$, and with a radius of curvature $r_{11}$ and with a concave front face of radius of curvature $r_{12}$ and has a thickness $d_{11}$, an index of refraction $N_6$ and an Abbe number $V_6$. It should be noted that lens L5 rear face and lens L6 front face have a common center of curvature forwardly of lens L6. The lens system 10 possesses the dimensions and relationships recited as above.

The following table 1 sets forth the radii of curvature of the lens faces, the lens spacing and thicknesses, the indices of refraction and the Abbe numbers of a specific example of the lens system illustrated in FIG. 1 and table 2 set forth the Seidel coefficients and their respective sums:

TABLE 1

| | | | |
|---|---|---|---|
| $r_1 = -22.317f$ | $d_0 = 1.097f$ | $N_1 = 1.753$ | $V_1 = 52.4$ |
| $r_2 = -1.280f$ | $d_1 = 0.236f$ | | |
| $r_3 = -1.280f$ | $d_2 = 0$ | $N_2 = 1.8051$ | $V_2 = 25.5$ |
| $r_4 = -1.981f$ | $d_3 = 0.062f$ | | |
| $r_5 = 1.327f$ | $d_4 = 0.009f$ | $N_3 = 1.753$ | $V_3 = 52.4$ |
| $r_6 = -2.274f$ | $d_5 = 0.334f$ | | |
| $r_7 = -2.274f$ | $d_6 = 0$ | $N_4 = 1.78472$ | $V_4 = 25.7$ |
| $r_8 = -50.535f$ | $d_7 = 0.062f$ | | |
| $r_9 = 0.887f$ | $d_8 = 0.009f$ | $N_5 = 1.753$ | $V_5 = 52.4$ |
| $r_{10} = -30.558f$ | $d_9 = 0.288f$ | | |
| $r_{11} = -4.403f$ | $d_{10} = 0.066f$ | $N_6 = 1.78472$ | $V_6 = 25.7$ |
| $r_{12} = 0.573f$ | $d_{11} = 0.062f$ | | |

TABLE 2

| Surface: | Spherical aberration | Coma | Astigmatism | Petzval sum | Distortion |
|---|---|---|---|---|---|
| 1 | −0.00002 | 0.00047 | −0.00993 | −0.01925 | 0.61911 |
| 2 | −0.02162 | −0.01057 | −0.00517 | −0.01289 | −0.00883 |
| 3 | 0.25580 | 0.02213 | 0.00191 | 0.22513 | 0.01964 |
| 4 | −0.00721 | −0.02616 | −0.09498 | 0.32381 | 0.83084 |
| 5 | −0.02785 | −0.02015 | −0.01458 | −0.00446 | −0.01378 |
| 6 | 0.42492 | 0.08413 | 0.01666 | 0.00870 | 0.00502 |
| 7 | −0.00004 | 0.00435 | −0.48023 | 0.48437 | −0.45795 |
| 8 | 1.49024 | 1.17854 | 0.93204 | 0.01406 | 0.74821 |
| 9 | −1.36624 | −1.17841 | −1.01641 | −0.09986 | −0.96281 |
| 10 | 1.02323 | −0.12280 | 0.64926 | −0.76757 | 0.62555 |
| Average | 0.77121 | −0.06849 | −0.02143 | 0.15205 | 1.40499 |

In FIG. 2 of the drawing there is illustrated another embodiment of the present invention which differs from that first described primarily in that the fifth and sixth lens elements are cemented together as a composite unit instead of being separated by an air space. Specifically, the lens system 11 includes six lens elements L11 to L16 respectively, lens elements L11 and L12 being cemented to form a first composite lens, lens elements L13 and L14 being cemented together to form a second composite lens, and lens elements L15 and L16 being cemented to form a third composite lens. It should be noted that the front face of lens element L14 is concave while that of corresponding lens L4 is convex, the front face of lens element L15 is concave and the rear face of lens element L16 is convex while the corresponding faces of lens elements L5 and L6 are convex and concave respectively. In other respects lens systems 10 and 11 are similar and similar symbols identify the lens element thicknesses and spacings, the radii of curvature of the faces of the lens elements, the lens element indices of refraction and Abbe numbers.

The following table 3 sets forth the lens element faces radii of curvature, the lens spacings and thicknesses, the indices of refraction and Abbe numbers of a specific example of the lens system 11 and table 4 sets forth the Seidel coefficients and their respective sums:

TABLE 3

| | | | |
|---|---|---|---|
| $r_1 = -9.231f$ | $d_0 = 1.097f$ | $N_1 = 1.7745$ | $V_1 = 50.1$ |
| $r_2 = -1.050f$ | $d_1 = 0.236f$ | | |
| $r_3 = -1.050f$ | $d_2 = 0$ | $N_2 = 1.80518$ | $V_2 = 25.5$ |
| $r_4 = -1.612f$ | $d_3 = 0.062f$ | | |
| $r_5 = 1.510f$ | $d_4 = 0.011f$ | $N_3 = 1.7745$ | $V_3 = 50.1$ |
| $r_6 = -2.411f$ | $d_5 = 0.334f$ | | |
| $r_7 = -2.411f$ | $d_6 = 0$ | $N_4 = 1.7557$ | $V_4 = 27.2$ |
| $r_8 = 12.322f$ | $d_7 = 0.062f$ | | |
| $r_9 = 0.828f$ | $d_8 = 0.007f$ | $N_5 = 1.7745$ | $V_5 = 50.1$ |
| $r_{10} = 10.567f$ | $d_9 = 0.288f$ | | |
| $r_{11} = 10.567f$ | $d_{10} = 0$ | $N_6 = 1.7557$ | $V_6 = 27.2$ |
| $r_{12} = 0.589f$ | $d_{11} = 0.062f$ | | |

TABLE 4

| Surface: | Spherical aberration | Coma | Astigmatism | Petzval sum | Distortion |
|---|---|---|---|---|---|
| 1 | −0.00031 | 0.00254 | −0.02069 | −0.04728 | 0.55293 |
| 2 | −0.02183 | −0.01353 | −0.00838 | −0.00912 | −0.01085 |
| 3 | 0.45483 | 0.13574 | 0.04051 | 0.27662 | 0.09464 |
| 4 | −0.00799 | −0.03882 | −0.18857 | 0.28906 | 0.48809 |
| 5 | 0.01641 | 0.01173 | 0.00839 | 0.00250 | 0.00779 |
| 6 | 0.29737 | 0.00101 | 0.0 | −0.03493 | −0.00012 |
| 7 | −0.00278 | −0.03940 | −0.55899 | 0.52726 | −0.45003 |
| 8 | 0.01352 | 0.00970 | 0.00695 | −0.00057 | 0.00458 |
| 9 | 0.00765 | −0.07109 | 0.66044 | −0.73063 | 0.65208 |
| Average | 0.75686 | −0.00213 | −0.06034 | 0.27290 | 1.33911 |

FIGS. 3A to 3D and 4A to 4D clearly illustrate the high degree of correction which characterizes the lens systems 10 and 11 respectively even at angles exceeding a field of view of 47°.

While there have been described and illustrated preferred embodiments of the present invention, it is apparent that numerous alterations, omissions and additions may be made without departing from the spirit thereof.

I claim:

1. A wide angle eyepiece lens system comprising six lens elements successively designated from the pupil side as the first to the sixth and having faces successively designated from the pupil side as the first to the twelfth the first, third and fifth lens elements being positive and the second, fourth and sixth lens elements being negative, the second, fourth, fifth, sixth and ninth lens faces being convex, the third, seventh and twelfth lens faces being concave, the first lens face having a longer radius of curvature than the fourth lens face, the eighth lens face having a longer radius of curvature than the fifth lens face, the tenth lens face having a longer radius of curvature than the ninth lens face, the eleventh lens face having a longer radius of curvature than the twelfth lens face, the first and second lens elements being cemented at their confronting faces to form a first positive doublet lens, the third and fourth lens elements being cemented at their confronting faces to form a second positive doublet lens, and the ninth and twelfth faces being substantially concentric.

2. The lens system of claim 1 wherein said first lens face is concave.

3. The lens system of claim 1 wherein said fifth and sixth lens elements are separated by an air space.

4. The lens system of claim 1 wherein said fifth and sixth lens elements are cemented together.

5. A wide angle eyepiece lens system comprising six lens elements successively designated from the pupil side as the first to the sixth and having faces successively designated from the pupil side as the first to the twelfth the first and second lens elements being cemented at their confronting faces to form a first positive doublet lens and the third and fourth lens elements being cemented at their confronting faces to form a second positive doublet lens, said lens system possessing the following dimensions and relationships:

| | | | |
|---|---|---|---|
| $r_1 = -22.317f$ | $d_0 = 1.097f$ | $N_1 = 1.753$ | $V_1 = 52.4$ |
| $r_2 = -1.280f$ | $d_1 = 0.236f$ | | |
| $r_3 = -1.280f$ | $d_2 = 0$ | $N_2 = 1.80518$ | $V_2 = 25.5$ |
| $r_4 = -1.981f$ | $d_3 = 0.062f$ | | |
| $r_5 = 1.327f$ | $d_4 = 0.009f$ | $N_3 = 1.753$ | $V_3 = 52.4$ |
| $r_6 = -2.274f$ | $d_5 = 0.334f$ | | |
| $r_7 = -2.274f$ | $d_6 = 0$ | $N_4 = 1.78472$ | $V_4 = 25.7$ |
| $r_8 = -50.535f$ | $d_7 = 0.062f$ | | |
| $r_9 = 0.887f$ | $d_8 = 0.009f$ | $N_5 = 1.753$ | $V_5 = 52.4$ |
| $r_{10} = -30.558f$ | $d_9 = 0.288f$ | | |
| $r_{11} = -4.403f$ | $d_{10} = 0.066f$ | $N_6 = 1.78472$ | $V_6 = 25.7$ |
| $r_{12} = 0.573f$ | $d_{11} = 0.062f$ | | | wherein $r_n$ is the radius of curvature of the subscript designated lens face $d_n$ is the axial spacing between the subscript designated lens face and the next successive lens face $N_n$ is the index of refraction at the $d$-line of the subscript designated lens elements, $V_n$ is the Abbe number of the subscript designated lens element, and $f$ is the focal length of the lens system.

6. A wide-angle eyepiece lens system comprising six lens elements successively designated from the pupil side as the first to the sixth and having faces successively designated from the pupil side as the first to the twelfth the first and second lens elements being cemented at their confronting faces to form a first positive doublet lens and the third and fourth lens elements being cemented at their confronting faces to form a second positive doublet lens, said lens system possessing the following dimensions and relationships:

| | | | |
|---|---|---|---|
| $r_1 = -9.231f$ | $d_0 = 1.097f$ | $N_1 = 1.7745$ | $V_1 = 50.1$ |
| $r_2 = -1.050f$ | $d_1 = 0.236f$ | | |
| $r_3 = -1.050f$ | $d_2 = 0$ | $N_2 = 1.80518$ | $V_2 = 25.5$ |
| $r_4 = -1.612f$ | $d_3 = 0.062f$ | | |
| $r_5 = 1.510f$ | $d_4 = 0.011f$ | $N_3 = 1.7745$ | $V_3 = 50.1$ |
| $r_6 = -2.411f$ | $d_5 = 0.334f$ | | |
| $r_7 = -2.411f$ | $d_6 = 0$ | $N_4 = 1.7557$ | $V_4 = 27.2$ |
| $r_8 = 12.322f$ | $d_7 = 0.062f$ | | |
| $r_9 = 0.828f$ | $d_8 = 0.007f$ | $N_5 = 1.7745$ | $V_5 = 50.1$ |
| $r_{10} = 10.567f$ | $d_9 = 0.288f$ | | |
| $r_{11} = 10.567f$ | $d_{10} = 0$ | $N_6 = 1.7557$ | $V_6 = 27.2$ |
| $r_{12} = 0.589f$ | $d_{11} = 0.062f$ | | | wherein $r_n$ is the radius of curvature of the subscript designated lens face, $d_n$ is the axial spacing between the subscript designated lens face and the next successive lens face, $N_n$ is the index of refraction at the $d$-line of the subscript designated lens element, and $f$ is the focal length of the lens system.